United States Patent [19]

Miyamoto

[11] Patent Number: 5,169,089
[45] Date of Patent: Dec. 8, 1992

[54] REEL BASE DRIVE APPARATUS FOR TAPE RECORDER

[76] Inventor: Hiroyuki Miyamoto, No. 122-22, Ooazamatsugou, Tokorozawa-shi, Saitama-ken, Japan

[21] Appl. No.: 759,847

[22] Filed: Sep. 16, 1991

Related U.S. Application Data

[63] Continuation of Ser. No. 507,989, Apr. 11, 1990, abandoned.

[30] Foreign Application Priority Data

Apr. 13, 1989 [JP] Japan .................................. 1-93921

[51] Int. Cl.$^5$ ............................................ B65H 16/10
[52] U.S. Cl. .................................................... 242/201
[58] Field of Search ........................ 242/201, 200, 192

[56] References Cited

U.S. PATENT DOCUMENTS

| | | | |
|---|---|---|---|
| 3,741,499 | 6/1973 | Osborn | 242/201 |
| 3,813,690 | 5/1974 | Oka | 242/201 X |
| 4,093,151 | 6/1978 | Karsh | 242/201 X |
| 4,171,111 | 10/1979 | Herleth | 242/201 |
| 4,391,416 | 7/1983 | Osanai | 242/200 X |
| 4,411,397 | 10/1983 | Korsh et al. | 242/192 |
| 4,460,136 | 7/1984 | Osanai | 242/209 X |

FOREIGN PATENT DOCUMENTS

| | | | |
|---|---|---|---|
| 2411544 | 8/1979 | France | 242/201 |
| 56-156952 | 12/1981 | Japan | 242/192 |
| 60-44237 | 3/1985 | Japan . | |
| 881849 | 11/1981 | U.S.S.R. | 242/201 |
| 727125 | 3/1955 | United Kingdom | 242/201 |

Primary Examiner—Daniel P. Stodola
Assistant Examiner—John P. Darling
Attorney, Agent, or Firm—Andrus, Sceales, Starke & Sawall

[57] ABSTRACT

A reel base drive apparatus used for driving reel bases of a tape recorder by rotation of pulleys driven by a reel motor of the tape recorder, the reel base drive apparatus including an arm rotatably supported on a driving shaft of the reel motor, a driving pulley fitted on the driving shaft of the reel motor, a driving pulley fitted on the driving shaft, driven pulleys rotatably supported at portions of the arm between which the driving pulley is placed, and expansible belts provided on the driven pulleys and each having a curved portion and a straight portion, the outside surfaces of the curved portions of the expansible belts being placed on the driving pulley and the inside surface of the straight portion being placed on the driven pulleys. The arm is rotated by a difference in tension of the belts to allow torque fluctuation of the reel motor to be absorbed.

3 Claims, 5 Drawing Sheets

FIG.6
FIG.7
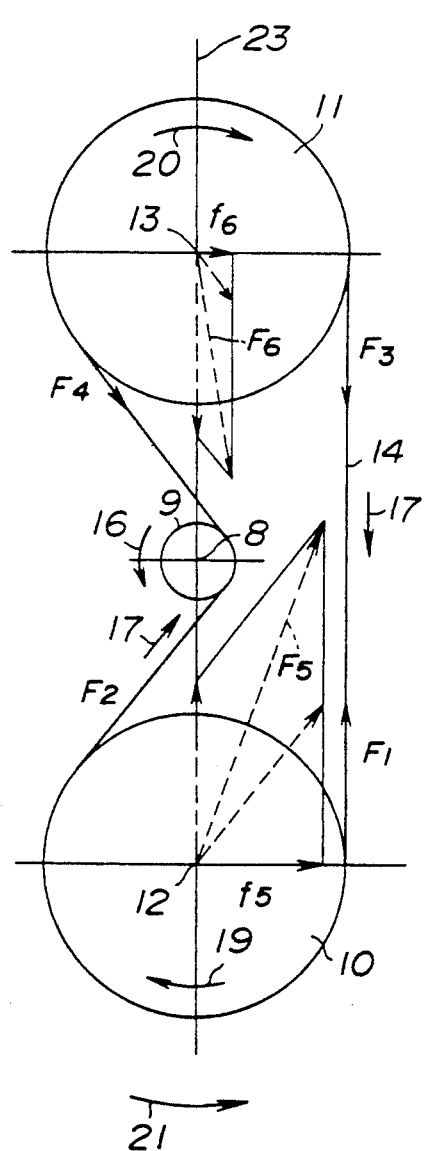
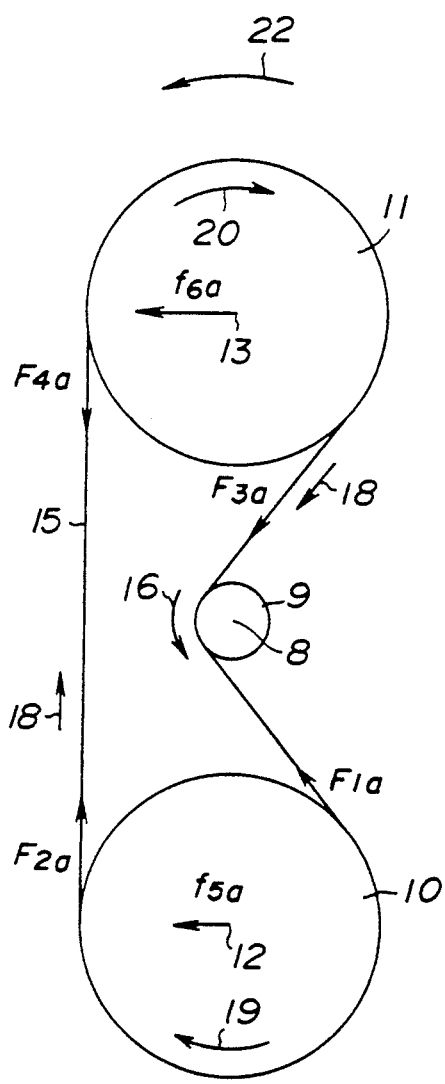

REEL BASE DRIVE APPARATUS FOR TAPE RECORDER

This present application is a continuation of U.S. patent application Ser. No. 07/507,989, filed Apr. 11, 1990, and now abandoned.

BACKGROUND OF THE INVENTION

The present invention generally relates to reel base drive apparatus, and more particularly to an apparatus for driving reel bases of a tape recorder.

It is desirable that a reel base drive apparatus be constructed to have no torque fluctuation of a reel motor influencing the motions of reel bases to minimize wow and flutter of the tape recorder, that the reel base drive apparatus require only a small number of parts in view of the cost of manufacturing products, and that the apparatus have high reliability.

Japanese laid-open utility model publication no. 60-44237 proposes the use of a torsion coil spring in a rotation transmitting system of a reel shaft drive apparatus which connects a reel motor to reel shafts for absorbing torque fluctuation of the reel motor. Elastic deformation of the torsion coil spring serves to absorb the torque fluctuation of the reel motor in operation.

A reel driving apparatus of the type similar to the above-described conventional apparatus requires a mechanism for serving to sway an arm through rotation of a reel motor. For this purpose, such a mechanism has a felt member provided between an arm and an idler to generate a frictional force for obtaining an oscillatory motion of the arm for smaller torque change.

However, for using such a felt member, a greater number of parts are necessary than that of the apparatus having no felt member, and the occurrence of a frictional force causes a loss of torque generated by the reel motor.

Further, changed properties of the felt member after long time use cause a change in the frictional force from the initial level, and a varying oscillatory force is applied to the arm, resulting in unstable driving of the reel shafts of the tape recorder.

SUMMARY OF THE INVENTION

Accordingly, it is a general object of the present invention to provide a novel and useful reel base drive apparatus for a tape recorder in which the above-described problems are eliminated.

A more specific object of the present invention is to provide a reel base drive apparatus in which torque fluctuation of the reel motor of the tape recorder is reduced to minimize wow and flutter.

Another object of the present invention is to provide a reel base drive apparatus which requires only a small number of parts to construct the apparatus in view of the cost of manufacturing products.

Still another object of the present invention is to provide a reel base drive apparatus which gives the tape recorder a stable operation with high reliability.

The above-described objects of the present invention are achieved by a reel base drive apparatus for driving reel bases of a tape recorder by rotation of pulleys driven by a reel motor of a tape recorder, which comprises an arm rotatably supported on a driving shaft of said reel motor, a driving pulley fitted on said driving shaft of said reel motor, driven pulleys rotatably supported on said arm at portions of said arm between which said driving pulley is placed, and a belt having a curved portion and a straight portion, the outside surface of said curved portion being placed on said driving pulley and the inside surface of said straight portion being placed on said driven pulleys, said arm being rotated by a difference in tension of said belt driven by said reel motor to permit a portion of said belt on said driven pulley to drive said reel base, allowing torque fluctuation of said reel motor to be absorbed.

According to the present invention, it is possible that the expansible belt serves to absorb torque fluctuation of the reel motor, and that a difference in tension of the belt caused by a normal level of rotational load by the driven pulleys allows a rotating force to act on the arm around the driving shaft, eliminating the need to use additional parts such as a felt member for generating a frictional force as in the conventional apparatus.

Other objects and further features of the present invention will be apparent from the following description when read in conjunction with the accompanying drawings.

BRIEF DESCRIPTION OF THE DRAWINGS

FIG. 6 is a diagram for explaining the function of a rotating and swaying force produced by the a first belt 14 in the apparatus 1 in the recording/reproducing mode.

FIG. 7 is a diagram for explaining the function of a rotating and swaying force produced by a second belt 15 in the apparatus 1 in the recording/reproducing mode.

DESCRIPTION OF THE PREFERRED EMBODIMENTS

Figure 1:
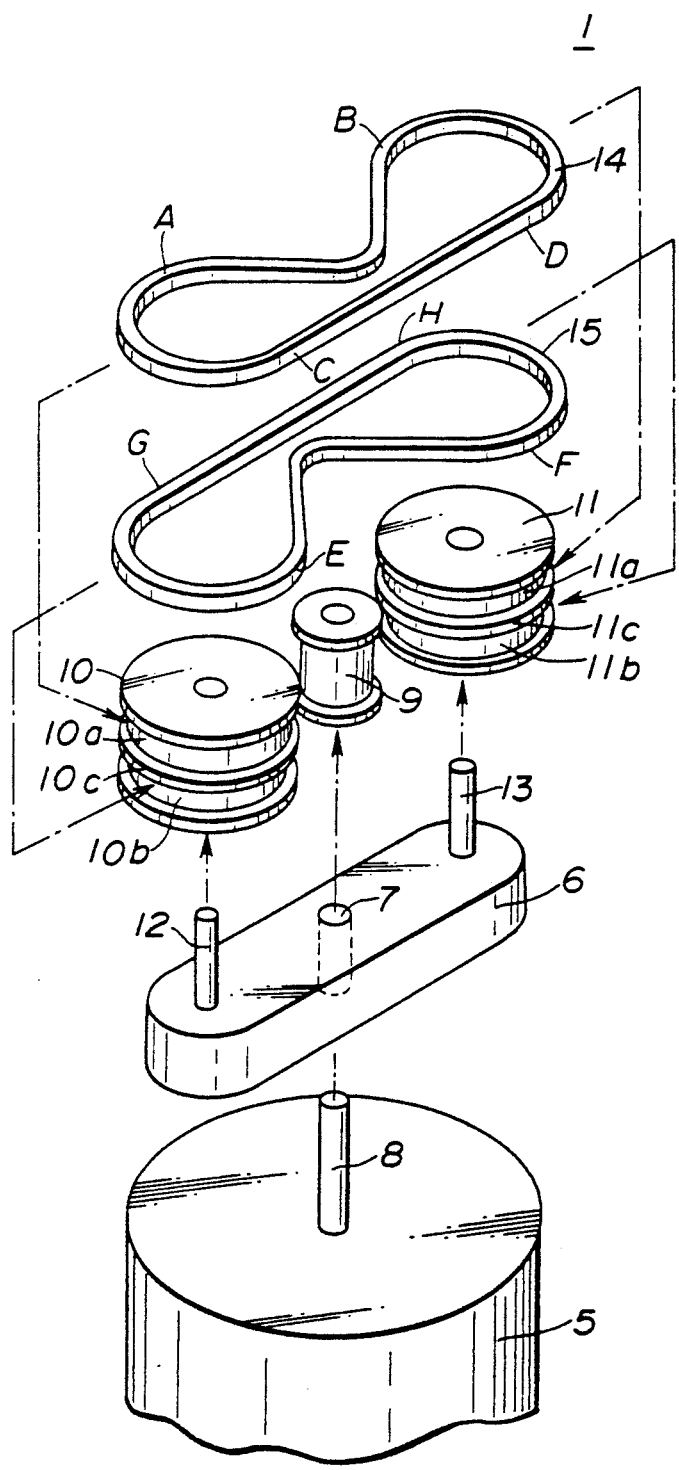
FIG. 1 is a perspective exploded view of an embodiment of a reel base drive apparatus 1 for a tape recorder 2 according to the present invention.
Figure 2:
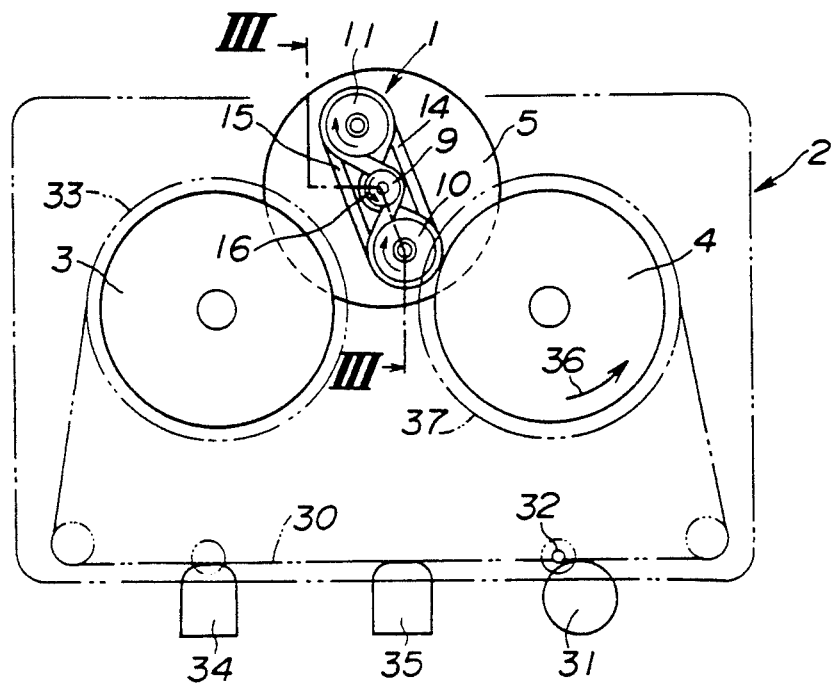
FIG. 2 is a plan view of the reel base drive apparatus 1 shown in FIG. 1 which is installed in the tape recorder 2.
Figure 3:
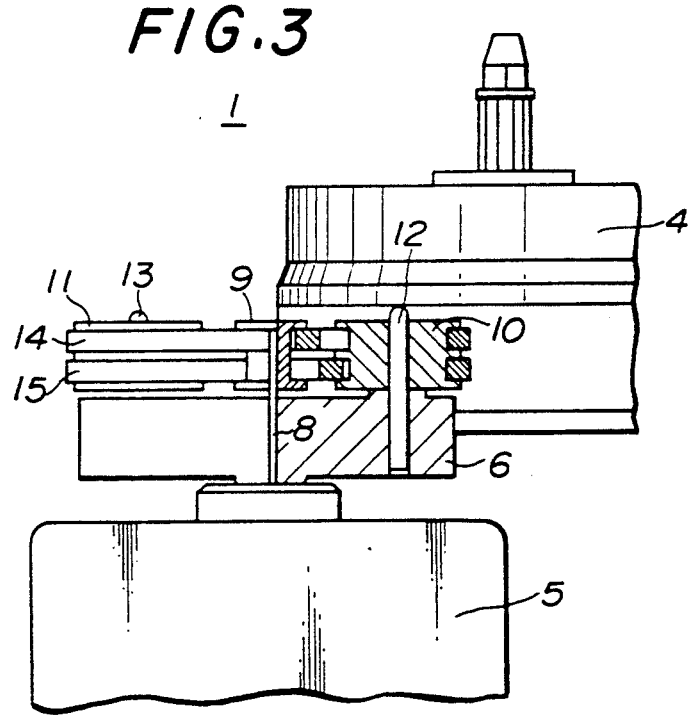
FIG. 3 is an enlarged sectional view of the reel base drive apparatus 1 taken approximately on a line corresponding with III—III shown in FIG. 2.

A preferred embodiment of a reel base drive apparatus 1 according to the present invention is shown in FIG. 1. As shown in FIG. 2, the reel base drive apparatus 1 is provided at a place between a pair of reel bases 3 and 4 in a tape recorder 2.

A description will be given of the reel base drive apparatus 1 by referring to FIGS. 1 through 5. A reel motor 5 of the tape recorder 2 is a conventional iron-core motor. An arm 6 of an elliptical shape has a hole 7 at the center thereof and is fitted on a driving shaft 8 of the reel motor 5. The arm 6 is therefore supported rotatably on the driving shaft 8 of the reel motor 5.

A driving pulley 9 is also fitted on the driving shaft 8 extending through the hole 7 of the arm 6. A pair of driven pulleys 10 and 11 are supported rotatably on a pair of shafts 12 and 13 respectively which are embedded in the arm 6. The driving pulley 9 is placed between the driven pulleys 10 and 11 on the arm 6 and the centers of the pulleys 9, 10 and 11 are located on the same straight line. In the driven pulley 10, two rows of first and second grooves 10a, 10b are formed and the grooves 10a and 10b are separated from each other by a flange 10c of the pulley 10. Similarly, in the driven pulley 11, two rows of first and second grooves 11a, 11b are formed and the grooves 11a and 11b are separated from each other by a flange 11c of the pulley 11.

A first belt 14 is connected between the first groove 10a of the pulley 10 and the first groove 11a of the pulley 11, and has a curved portion AB and a straight portion CD. As shown in FIG. 1, letters A through D herein refer to major locations of the first belt 14, and letters E through H refer to major locations of a second belt 15 described below. The outside surface of the curved portion AB of the first belt 14 is placed on the driving pulley 9, while the inside surface of the straight portion CD is placed on the driven pulleys 10 and 11.

A second belt 15 is connected between the second groove 10b of the pulley 10 and the second groove 11b of the pulley 11, and has a curved portion EF and a straight portion GH. The outside surface of the curved portion EF of the second belt 15 is placed on the driving pulley 9, while the inside surface of the straight portion GH is placed on the driven pulleys 10 and 11. The curved portion EF of the second belt 15 is placed on the driving pulley 9, while the inside surface of the straight portion GH is placed on the driven pulleys 10 and 11. The curved portion EF of the belt 15 is placed on a part of the pulley 9 opposite to the curved portion AB of the belt 14.

During operation there is no friction between the belts 14 and 15, which, as described above, are separated from each other by the flange 10c of the pulley 10 and by the flange 11c of the pulley 11.

Both the belts 14 and 15 have a rectangular cross section and a hardness equivalent to JIS 62 degrees, and are slightly expansible. Preferably for the belts 14 and 15 according to the present invention, belts made of plastic material, for example, that plastic material sold under the trademark "Urepan #640" may be used. The trademark "Urepan #640" identifies a material made and sold by Sumitomo Bayer Urethane Co., Ltd. in Japan. As described below, these belts 14 and 15 during operation of the tape recorder 2 serve to absorb torque fluctuation of the reel motor 5, and to apply a rotating and swaying force to the arm 6.

Figure 4:
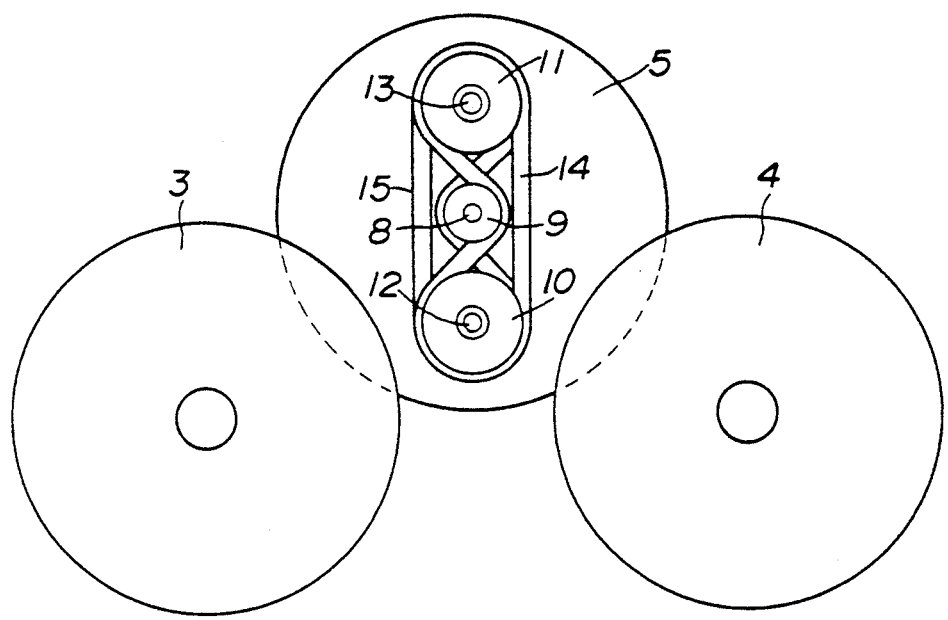
FIG. 4 is a plan view of the reel base drive apparatus 1 in a stop mode of the tape recorder 2 shown in FIG. 2.

In the stop mode of the tape recorder 2 when the reel motor stops running, the tension forces in the belts 14 and 15 are in equilibrium, no rotational force is applied, and the reel base drive apparatus is in the position shown in FIG. 4.

When the reel motor 5 rotates nn a direction indicated by the arrow 16 in FIGS. 6 and 7, the first and second belts 14 and 15 run in a direction indicated by the arrows 17 and 18, respectively. The driven pulley 10 rotates in a direction indicated by the arrow 19 and the driven pulley 11 in a direction indicated by the arrow 20, as shown.

In the case of the first belt 14, the tension forces F1 through F4 of the first belt 14 act on the driven pulleys 10 and 11 as shown in FIG. 6. F2 is increased and F4 is decreased. This is caused by a normal level of rotational load by the driven pulleys 10 and 11. A resultant force F5 caused by the tension forces F1 and F2 acts on the shaft 12 of the arm 6, while a resultant force F6 caused by the tension forces F3 and F4 acts on the shaft 13 of the arm 6. f5 is a component of the resultant force F5 in a direction perpendicular to a line 23 passing through the centers of the shafts 12 and 13 and the driving shaft 8. Similarly, f6 is a component of the resultant force F6 in the same direction. In this case, f5 is greater than f6. Therefore, a rotating force in a counterclockwise direction as indicated by the arrow 21 in FIG. 6 acts on the arm 6 around the driving shaft 8.

In the case of the second belt 15, the tension forces F1a through F4a of the second belt 15 acts on the driven pulleys 10 and 11, as shown in FIG. 7. F3a is increased and F1a is decreased. This is caused by a normal level of rotational load by the driven pulleys 10 and 11. Similarly, f5a is a component of a resultant force caused by the tension forces F1a and F2a in a direction perpendicular to the line 23, while f6a is a component of a resultant force caused by the tension forces F3a and F4a in the same direction. In this case, f6a is greater than f5a. Therefore, a rotating force in a counterclockwise direction, as indicated by the arrow 22 in FIG. 7, acts on the arm 6 around the driving shaft 8.

Figure 5:
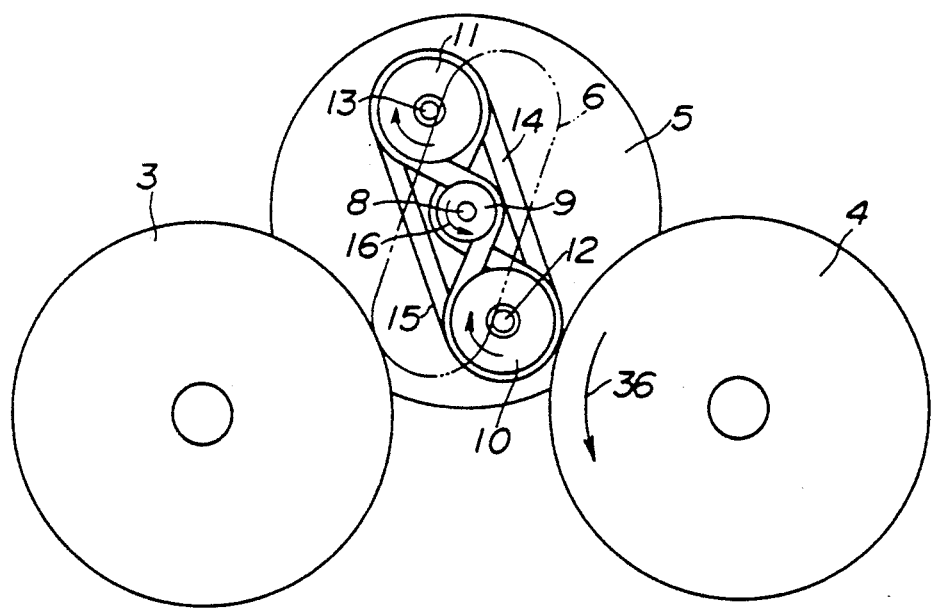
FIG. 5 is a plan view of the reel base drive apparatus 1 in a recording/reproducing mode of the tape recorder 2 shown in FIG. 2.

As shown in FIGS. 2 and 5, the above-described rotating force produced by the belts 14 and 15 allows the arm 6 to rotate in a counterclockwise direction around the driving shaft 8. The driven pulley lo approaches the reel base 4 of the tape recorder 2 and pushes the reel base 4. Actually, the reel base 4 is pressed by the outside portions of the belts 14 and 15 wound on the driven pulley 10.

Next, a description of the operation of the above-described reel base drive apparatus in the recording/reproducing mode of the tape recorder will be given below.

In the recording/reproducing mode, a magnetic tape 30 is driven while being held between a pinch roller 31 and a capstan 32 of the tape recorder 2, as shown in FIG. 2. The magnetic tape 30 is fed from a tape winding member 33 on the reel base 3 side, and passes by an erasing head 34 and a recording/reproducing head 35 of the tape recorder 2, and goes by tape driving parts including the pinch roller 31 and the capstan 32. Then the tape 30 is wound by the reel motor 5 on a tape winding member 37 on the reel base 4 side in a forward direction indicated by the arrow 36 in FIG. 2.

When the reel motor 5 rotates in a forward direction indicated by the arrow 16 in FIG. 5, the arm 6 rotates in a counterclockwise direction and is brought into contact with the reel base 4, as described above. The outside surfaces of the belts 14 and 15 being placed on the driven pulley 10 connect with the reel base 4, and the reel base 4 is rotated in a forward direction indicated by the arrow 36 by the reel motor 5 via the belts 14 and 15.

Torque fluctuation of the reel motor 5 is absorbed by the expansible belts 14 and 15. This allows the reel base 4 to rotate without torque fluctuation of the reel motor 5 to minimize wow and flutter of the tape recorder 2.

A difference in tension of the belts 14 and 15 caused by a normal level of rotational load by the pulleys 10 and 11 allows the above described rotating force to be applied to the arm 6. No additional parts such as a felt member for generating a frictional force thus need to be used in the reel base drive apparatus according to the present invention. The rotating force applied to the arm 6 remains stable when used over a long period of time, the driving of the reel bases does not easily change over a long period of time and a stable operation of the reel motor results. Accordingly, the reel base drive apparatus according to the present invention provides a stable reel motor operation with high reliability.

When the reel motor 5 of the tape recorder 2 rotates in a reverse direction, the arm 6 rotates in a clockwise direction and comes to a position indicated by a phantom line in FIG. 5 where it is brought into contact with the reel base 3. The reel base 3 is driven in a reverse tape winding direction. This allows a reverse recording/reproducing operation of the tape recorder 2.

Figure 8:
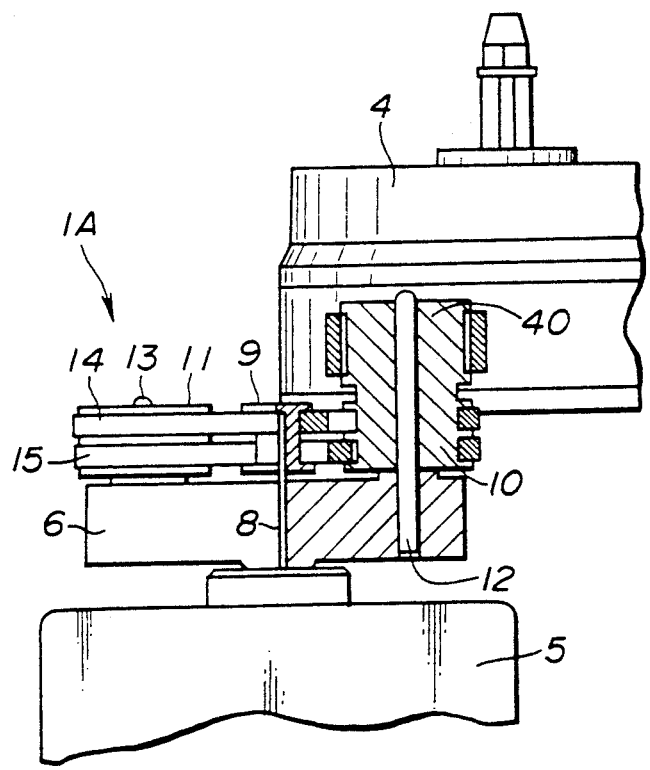
FIG. 8 is an enlarged sectional view showing an embodiment of a modified reel base drive apparatus 1A according to the present invention.

FIG. 8 shows an embodiment of a modified reel base drive apparatus 1A according to the present invention. The reel base drive apparatus 1A includes a roller 40 formed integrally with the driven pulley 10. The roller 40 serves to drive the reel base 4 and to prevent the outside surfaces of the belts 14 and 15 from being worn over a long period of time.

In the above described embodiments, two expansible belts 14 and 15 are used, but obviously only one belt can be used instead.

As in the foregoing, the use of an expansible belt in the reel base drive apparatus according to the above description allows the torque fluctuation of the reel motor to be absorbed. And since a rotating force for swaying the arm is obtained by a difference in tension of the belts acting on the pulleys owing to a normal level of rotational load by the pulleys, additional parts such as a felt member for generating a frictional force are unnecessary. Therefore, the number of parts required can be reduced to decrease the cost of manufacturing products and to improve efficiency of assembly operations. Also, it is possible that the deterioration of the material due to the driving of the reel bases for a long period of time will be eliminated and thus improve reliability and that the loss of torque generated by the reel motor will be remarkably reduced.

Further, the present invention is not limited to these embodiments, but various variations and modifications may be made without departing from the scope of the present invention.

What is claimed is:

1. A reel base drive apparatus for driving reel bases on a tape recorder through rotation of pulleys driven by a reel motor of the tape recorder, comprising:
   an arm rotatably supported on a driving shaft of the reel motor, the arm including
      a first shaft fixed at a first end portion of the arm;
      a second shaft fixed at a second end portion of the arm;
   a first driven pulley rotatably supported on said first shaft;
   a second driven pulley rotatably supported on said second shaft;
   a driving pulley fitted on the driving shaft of the reel motor, said driving pulley being placed between said first and second driven pulleys such that said driving pulley and said driven pulleys are aligned on said arm substantially along a straight line in a plane perpendicular to the axis of rotation of the driving shaft;
   a first belt having a first curved portion and a first straight portion, said first belt being stretched around said driving pulley and said first and second driven pulleys, the outside surface of said first curved portion being placed on said driving pulley, the inside surface of said first straight portion being placed on said first and second driven pulleys such that said first belt applies a first tension force component to said first driven pulley and applies a second tension force component to said second driven pulley;
   a second belt having a second curved portion and a second straight portion, said second belt being stretched around said driving pulley and said first and second driven pulleys, the outside surface of said second curved portion being placed on said driving pulley, the inside surface of said second straight portion being placed on said first and second driven pulleys such that said second belt applies a third tension force component to said first driven pulley, and applies a fourth tension force component to said second driven pulley;
   wherein the arm is rotated in a first direction around the driving pulley when said second tension force component is greater than said first tension force component, or when said third tension force component is greater than said fourth tension force component;
   wherein the reel bases of the tape recorder are engaged with and are driven by the first and second belts placed on the driving pulley and on the driven pulleys when said arm is rotated; and
   wherein said first and second belts are expansive and are made of a belt material appropriate for allowing fluctuation of torque transmitted from the reel motor to the reel bases through said first and second expansive belts to be absorbed.

2. The reel base drive apparatus of claim 1, wherein each of said first and second driven pulleys has a plurality of rows of grooves formed thereon and a plurality of flanges separating one groove from another; and
   wherein each of said first and second belts has a rectangular cross section.

3. The reel base drive apparatus of claim 1, wherein first driven pulley and said second driven pulley is each provided with an integrally formed roller for driving one of said reel bases of the tape recorder, said one of said reel bases being engaged with and driven by the integrally formed roller.

* * * * *

UNITED STATES PATENT AND TRADEMARK OFFICE
CERTIFICATE OF CORRECTION

PATENT NO. : 5,169,089
DATED : December 8, 1992
INVENTOR(S) : H. Miyamoto

It is certified that error appears in the above-identified patent and that said Letters Patent is hereby corrected as shown below:

On the title page:

ASSIGNEE

[73] Assignee: Teac Corporation, Japan

IN THE CLAIMS

CLAIM 1, Col. 5, Line 43, delete "on" and substitute therefore ---of---

Signed and Sealed this

Ninth Day of November, 1993

Attest:

BRUCE LEHMAN

*Attesting Officer*     *Commissioner of Patents and Trademarks*